United States Patent
Niebling et al.

[11] Patent Number: 6,106,156
[45] Date of Patent: Aug. 22, 2000

[54] DEVICE FOR FASTENING ROLLING-CONTACT BEARING RINGS

[75] Inventors: Peter Niebling, Bad Kissingen; Roland Langer, Schwanfeld; Rainer Breitenbach, Gochsheim; Heinrich Hofmann, Schweinfurt, all of Germany

[73] Assignee: FAG Automobiltechnik AG, Germany

[21] Appl. No.: 09/186,768

[22] Filed: Nov. 5, 1998

[30] Foreign Application Priority Data

Nov. 5, 1997 [DE] Germany ............... 197 48 729

[51] Int. Cl.⁷ .................. F16C 43/00; B25G 3/02
[52] U.S. Cl. ........................... 384/538; 403/365
[58] Field of Search .................. 403/365, 367, 403/368, 355, 282; 384/487, 537, 538, 539, 584, 585, 559, 561, 569, 903

[56] References Cited

U.S. PATENT DOCUMENTS

| | | | |
|---|---|---|---|
| 3,871,226 | 3/1975 | Janiszewski | 384/903 X |
| 4,589,793 | 5/1986 | Nilsson et al. | 403/377 X |
| 5,061,091 | 10/1991 | Shiratori | 384/539 |
| 5,141,356 | 8/1992 | Chaize | 403/368 |
| 5,207,514 | 5/1993 | Weissgerber | 384/537 X |
| 5,437,510 | 8/1995 | Jeng | 384/538 |
| 5,536,075 | 7/1996 | Bertetti | 384/585 X |
| 5,536,101 | 7/1996 | Schwarzler et al. | 403/282 |
| 5,639,176 | 6/1997 | Mullenberg | 403/282 |
| 5,678,934 | 10/1997 | Fischer et al. | 384/489 |
| 5,711,617 | 1/1998 | Scheller | 384/903 X |
| 5,713,246 | 2/1998 | Thoolen | 403/367 X |
| 5,927,867 | 7/1999 | Niebling et al. | 384/539 |
| 5,975,766 | 11/1999 | Cau | 384/538 |

*Primary Examiner*—David A. Bucci
*Assistant Examiner*—Colby Hansen
*Attorney, Agent, or Firm*—Ostrolenk, Faber, Gerb & Soffen, LLP

[57] ABSTRACT

For seating a rolling contact bearing ring in a housing or on a shaft, first and second grooves are formed in the cooperating periphery of either the rolling contact bearing ring or the housing or shaft. The first groove extends axially and is followed by the second groove that is inclined to form a conical surface at the rolling contact bearing ring. An intermediate ring is installed from the lateral entrance side of the bearing in the first groove and is plastically deformed, inclined into the second groove. A recess in the housing or shaft receives the deformed part of the intermediate ring. The remaining axial part of the bearing includes the diameter of the rolling contact bearing ring and of the cooperating housing or shaft that are the same diameter. The intermediate ring may include a flange that engages the entrance side of the bearing to position the intermediate ring. The intermediate ring may be the peripheral region of a pot-shaped cover over the entrance side of the bearing. The bearing ring with the intermediate ring in the first groove may be installed in the housing or on the shaft using one ram. The intermediate ring is then plastically deformed into the second groove by a second ram.

12 Claims, 3 Drawing Sheets

ND CONTACT BEARING RINGS

DEVICE FOR FASTENING ROLLING-CONTACT BEARING RINGS

BACKGROUND OF THE INVENTION

The present invention relates to a device for fastening a bearing ring in a housing or onto a shaft.

A device for fastening a rolling-contact bearing ring in a housing is disclosed in DE-C 667 422. The fastening is done with the aid of two bushes. When the bushes are mounted, they are pushed onto a double-wedge ring and are pressed into a groove in the housing. However, this known device has several disadvantages. First, it is comprised of a relatively large number of parts, which makes its assembly difficult. Secondly, it is impossible to achieve good seating, since bushes, which are subject to tolerances, are arranged between the bearing ring and the housing. In particular, no reliable axial fastening is expected, specifically because the bushes may easily loosen over time, for example as a result of shocks, and the peened-over edges may be bent back.

SUMMARY OF THE INVENTION

It is therefore the object of the invention to provide a device of simple construction, which affords good and operationally reliable seating and fastening of a bearing ring in a housing or on a shaft.

For seating a rolling-contact bearing ring in a housing or on a shaft, a groove is formed in the cooperating periphery of either the rolling contact bearing ring or of the housing or shaft. The groove comprises a first groove that extends axially from the lateral entrance side and a second groove that extends axially in from the first groove and is both axially and radially inclined forming a conical surface at the periphery of the rolling contact bearing ring. There is a recess in the other of the bearing ring or in the housing or shaft that cooperates with and overlies the groove.

An intermediate ring is installed from the entrance side of the bearing in the first groove and is plastically deformed conically to extend into the second groove. The recess in the bearing ring or in the housing or shaft receives the deformed part of the intermediate ring. Axially beyond the second groove, the remaining diameter of the periphery of the rolling contact bearing ring at and on the cooperating periphery of the housing or shaft are of the same diameter so that the peripheries rest against each other.

The intermediate ring may include a flange that engages the lateral entrance side of the first groove and positions the intermediate ring. The intermediate ring may be the peripheral region of a pot-shaped cover over the entrance side of the bearing at the entrance to the first groove.

The bearing ring may be installed in the housing or shaft with one ram and the intermediate ring may thereafter be installed from the entrance side into the first groove and plastically deformed into the second groove by a second ram. This fastens both the bearing ring and the intermediate ring in place.

Since part of the intermediate ring is arranged in a front-end groove in the bearing ring, only one intermediate ring is necessary. The remaining part of the intermediate ring is pressed onto a conical surface of the contact-bearing running ring of the bearing and that part of the intermediate ring extends into the recess in the housing or in the shaft. This effects a very good and reliable force-transmitting and positively locking axial connection between the parts.

That connection is achieved in particular by the remaining diameter axial regions of the bearing ring corresponding to that of the housing or of the shaft. If the contact-bearing running ring were to try to move out axially, the plastically deformed part of the intermediate ring would have to be sheared off. However, this would require axial thrust forces at a level which does not occur in operation.

The radially overlying groove and cooperating recess that receive the intermediate ring are bounded by opposite radially spaced apart surfaces, one on the bearing ring and the other on the housing or shaft. The surface on the bearing ring has a greater angle from the axis than the other surface providing better adhesion of the intermediate ring in the recess.

A flange on one end of the intermediate ring limits the push-in depth or axial depth of that ring. When the intermediate ring is the peripheral region of a pot shaped cover, the pot shaped cover effects additional sealing of the bearing.

Mounting of the bearing rings is particularly beneficial using a special procedure. Specifically, if the pressure on the first ram which presses in the bearing in the housing or on the shaft is maintained until the intermediate ring is pressed in by the second ram, the contact bearing running ring springs back axially after the removal of the second ram. This produces additional clamping in the shearing cross section of the intermediate ring.

The invention also includes the geometric converse of the specifically disclosed arrangement, wherein the intermediate ring is seated in the housing or on the shaft and the recess is arranged in the running ring.

Other objects, features and advantages of the present invention will become apparent from the following description of the invention which refers to the accompanying drawings.

DETAILED DESCRIPTION OF THE INVENTION

Figure 1:
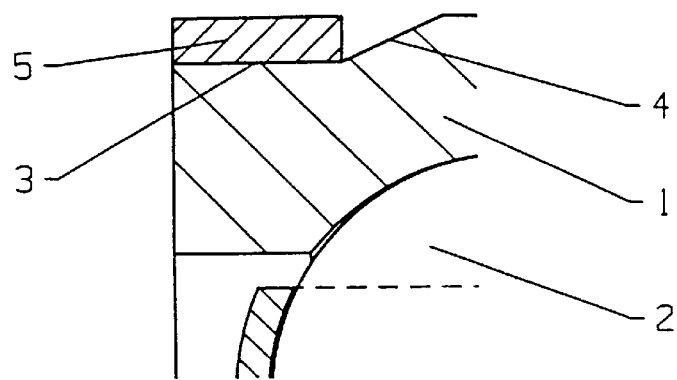
FIG. 1 shows a longitudinal section of a fragment of a ball bearing with an intermediate ring according to the invention in the preassembled state.

FIG. 1 shows a fragment of an outer ring 1 of a ball bearing 2 before the bearing is fully assembled. According to the invention, a first groove 3 extends axially in from the lateral entrance side of the bearing. The first groove 3 merges into an axially adjacent second conical section groove 4 which is inclined radially outwardly. Both grooves are provided on the outer peripheral surface of the outer contact bearing ring. An intermediate ring 5, which is initially not radially deformed, is arranged in the groove 3 and is cooperatingly oriented axially. The groove 3 is open to the axial side of the bearing to receive the intermediate ring.

Figure 2:
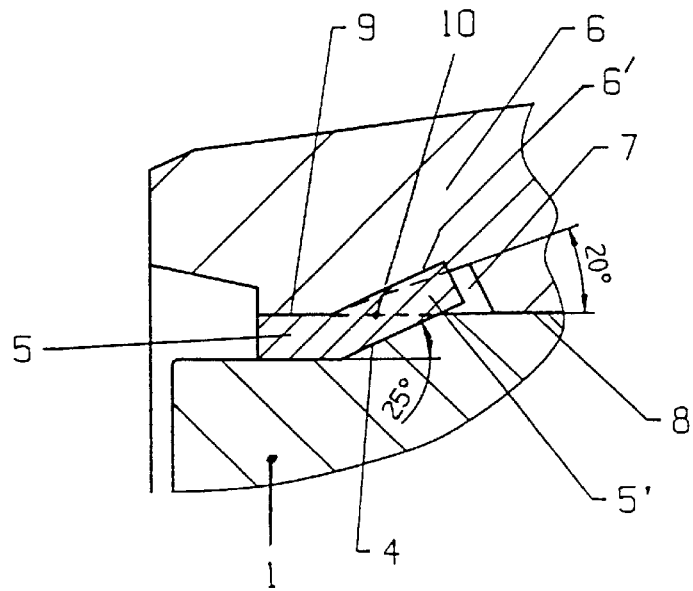
FIG. 2 shows a smaller fragment according to FIG. 1 in the assembled state.

When this structural unit including the intermediate ring on the bearing outer ring 1 is then pressed into a housing 6 that surrounds the outer ring, this produces the combination shown in FIG. 2. An axially inward part 5' of the intermediate ring 5 is pushed onto the conically outwardly inclined axially adjacent conical section 4 of the groove of the outer ring 1. This first conical section has an angle of about 25° to the axis The part 5' is plastically deformed in the groove as a result. That part 5' is then pressed into a cooperatingly shaped recess 7 in the housing 6. This recess 7 also has a radially inwardly facing conical section 6', on which the ring part 5' comes to rest. This second conical section has an angle of about 20° to the axis.

In this case, the remaining diameter region 8 of the external periphery of the outer ring 1 located axially inward past the grooves 3, 4 and the recess 7 corresponds in outer diameter 9 to the inner diameter of the inner periphery of the housing 6.

If the bearing outer ring 1 then tries to move axially outward from the housing 6, the ring 1 is prevented from so moving by a positive connection. The part 5', which has been plastically deformed and therefore projects into the recess 7, is the significant element. Axial movement could occur only if the axial forces are extremely large. However, a shearing action on the part 5 in the region 10 would be necessary. Such high forces are not expected in practice, since other parts of the bearing would already have been destroyed.

Figure 3:
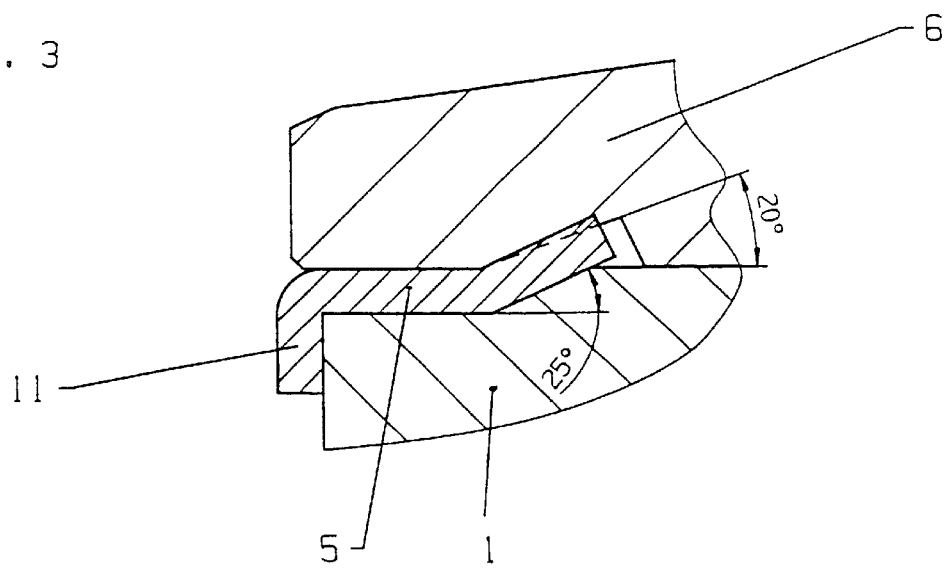
FIG. 3 shows a fragment of one variant of FIG. 2.
Figure 4:
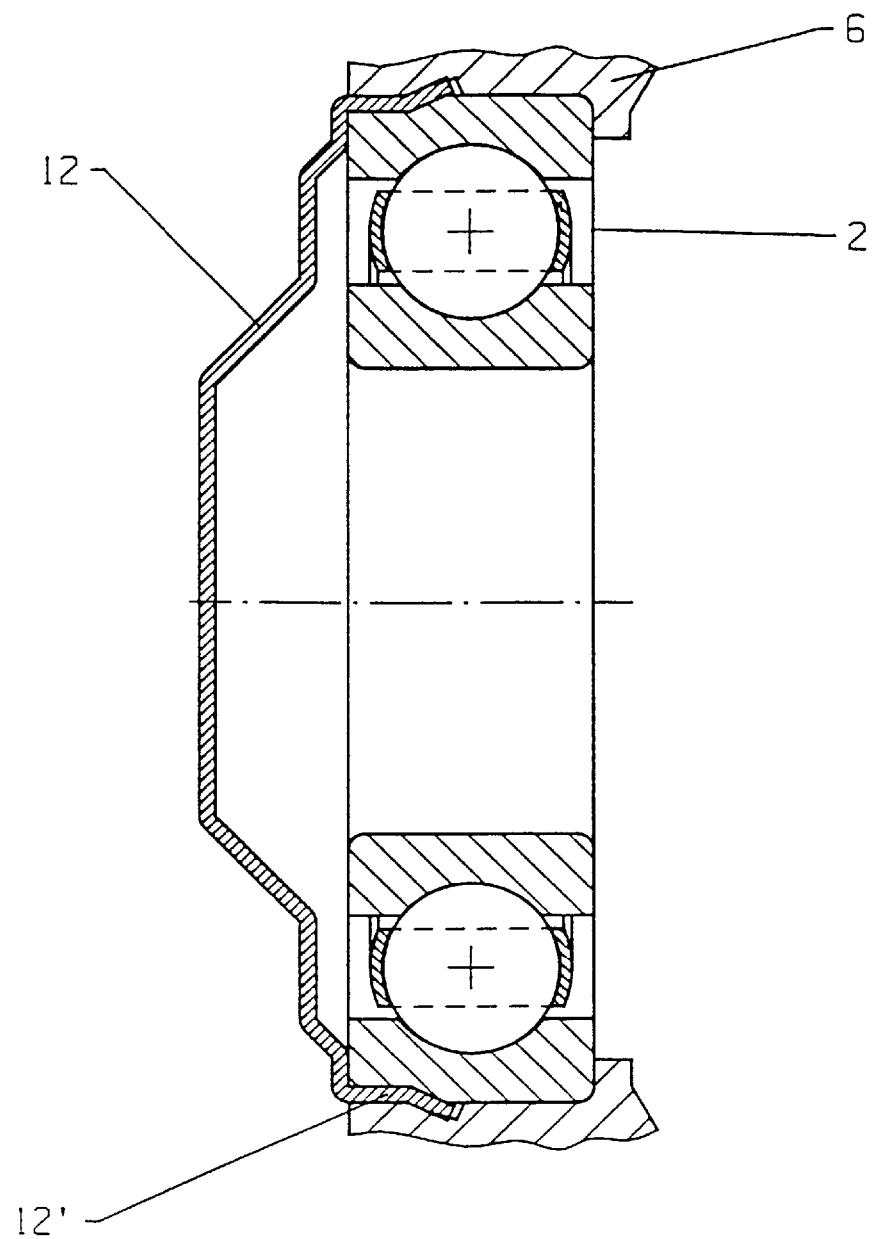
FIG. 4 shows a cross section through a further variant of FIG. 2.

FIGS. 3 and 4 show that the intermediate ring 5 is able to perform further functions. In FIG. 3, the ring 5 has a radially oriented flange 11 in the region of the axial entrance end face of the outer ring 1. This defines the insertion depth of the intermediate ring using simple means.

It is often intended that the bearing 2 be sealed at its front entrance end. FIG. 4 shows a pot-shaped cover 12 which has the intermediate ring defined as and around its periphery and which is optimally fastened in the axially oriented region 12', as described above. The cover 12 both seals the bearing and defines the intermediate ring.

In the illustrated embodiments, the intermediate ring is seated in a groove on the running ring of the bearing while the housing around that ring has the recess. The converse is possible, wherein the recess is in the bearing running ring while the intermediate ring is simply seated on the housing.

Figure 5:
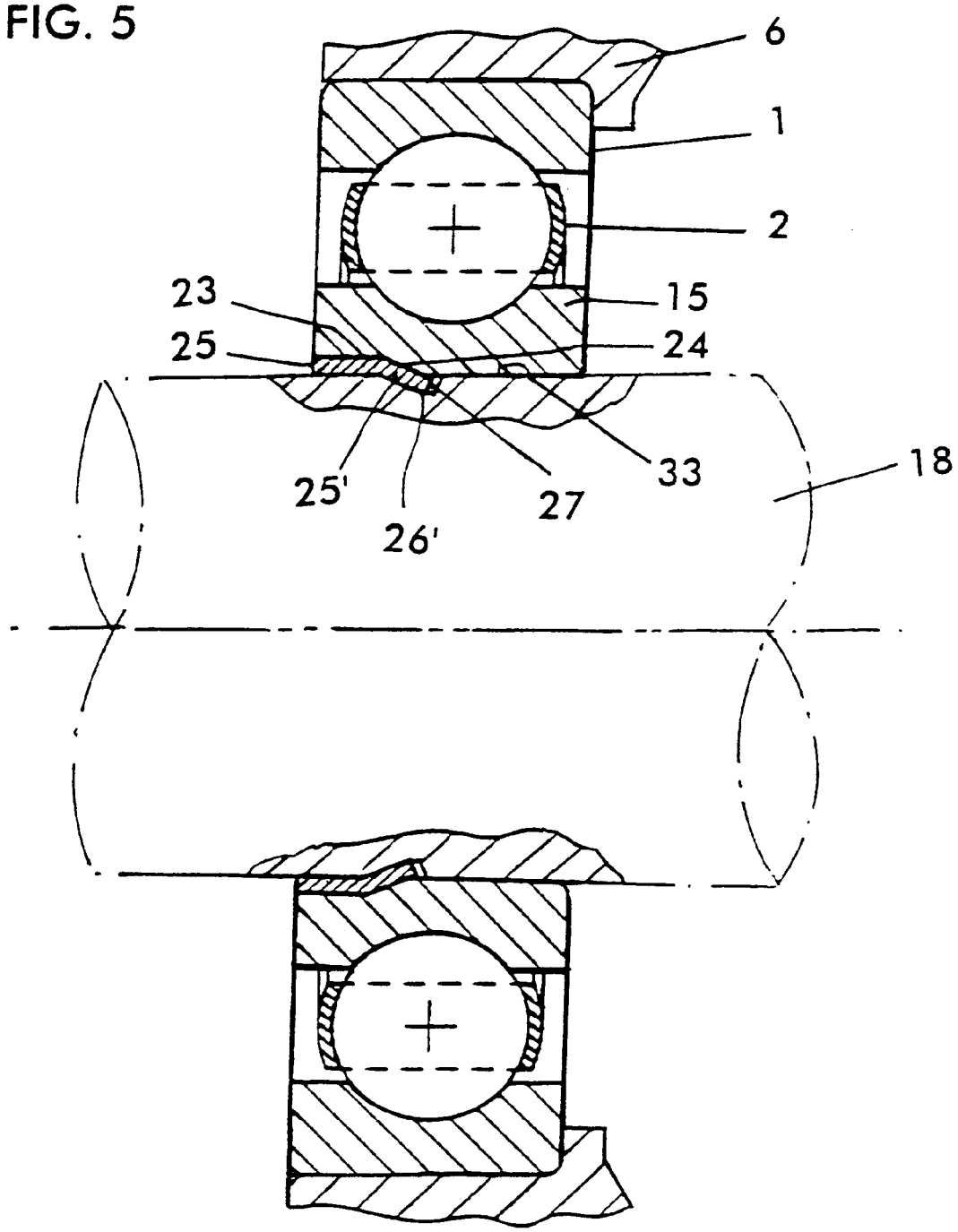
FIG. 5 shows a longitudinal section of an alternate embodiment of the ball bearing with an intermediate ring.

Also, the arrangement illustrated above concerns an outer ring of a bearing held in a housing. It may also be used at an inner ring or on a shaft and the connection between the inner ring and the shaft on which the inner ring is disposed. FIG. 5 illustrates an alternate embodiment wherein the intermediate ring is between the bearing inner ring and the shaft. Elements in FIG. 5 which correspond to those in FIGS. 1–4 have the same reference numbers and are not described in detail.

In this embodiment, the inner ring 15 of the ball bearing 2 is shown mounted on the shaft 18 with which it rotates. To secure the inner ring on the shaft, the axially extending first groove 23 merges into an axially adjacent second conical section groove 24 which is inclined radially inwardly. Both of the grooves 23 and 24 are provided on the outer peripheral surface 33 of the inner contact bearing ring 15. An intermediate ring 25 has the characteristics of the above-described ring 5 and is installed in the groove 23 and the adjacent conical section 24, as was done with the first embodiment.

The intermediate ring 25 has an axially inward part 25' which is pushed onto the conically inwardly inclined, axially adjacent conical section 24 of the groove 23 in the inner ring. That part 25' is then pressed into a cooperatingly shaped recess 27 in the shaft 18. This recess 27 also has a radially inwardly facing conical section 26' on which the intermediate ring part 25' comes to rest. As with the first embodiment, if the bearing inner ring 15 tries to move axially outward with respect to the shaft 18, the ring 15 is prevented from so moving by the positive connection, in particular the part 25' which has been plastically deformed and therefore projects into the recess 27.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device for fastening a ring of a bearing in a housing or on a shaft, wherein the bearing includes a rolling contact bearing ring including a race and includes rolling elements which roll over the race of the rolling contact bearing ring;

the bearing ring having a first radial side on which the race is formed and having a second opposite radial side;

at least one of the second radial side of the bearing ring on the one hand and the housing or the shaft on the other hand has a lateral entrance side, a first axially extending groove inward from the entrance side, a second radially and axially inclined groove communicating axially inward from the first groove and defining a first conical surface of the respective one of the bearing ring and the housing or shaft in which the groove is formed and the first and second grooves opening toward the other of the bearing ring and the housing or shaft;

an intermediate ring extending axially into and through the first groove and axially into the second groove and being deformed to the shape of the first conical surface, and the intermediate ring resting on the second surface of the rolling contact bearing ring;

a recess for receiving the intermediate ring provided in the other of the bearing ring and the housing or shaft in which the groove is not formed.

2. The device of claim 1, wherein axially inward beyond the second groove, the housing or the shaft in or on which the rolling contact bearing ring is disposed has a third surface of a first diameter and the rolling contact bearing ring has a cooperating fourth surface that cooperates with the third surface and has a second diameter corresponding to the first diameter for holding the rolling contact bearing ring in the housing or on the shaft.

3. The device of claim 1, wherein the recess located in the respective one of the housing or shaft in which the groove is not formed has a second conical surface which is opposite and spaced from the first conical surface;

the one of the first and second conical surfaces at the bearing ring having a larger angle of inclination with respect to the axis of the bearing than the other of the first and second conical surfaces.

4. The device of claim 3, wherein the angle of the first conical surface is about 25° and the angle of the second conical surface is about 20°.

5. The device of claim 1, wherein the intermediate ring further includes a radially oriented flange positioned at the entrance side of the bearing ring for controlling the extent of insertion of the intermediate ring in the groove.

6. The device of claim 1, further comprising a pot-shaped cover over the entrance side, the cover having a periphery and the intermediate ring being formed at and from the periphery of the cover.

7. A device for fastening an outer ring of a bearing in a housing, wherein the bearing includes a rolling contact bearing outer ring including a race and includes rolling elements which roll over the race of the outer ring;

the outer ring having a first inner radial side on which the race is formed and having a second opposite outer radial side;

the second outer radial side of the contact ring has an axial entrance side, a first axially extending groove inward from the entrance side, a second radially outwardly and axially inclined groove communicating axially inward from the first groove and defining a first conical surface of the bearing ring and the first and second grooves opening toward the housing;

an intermediate ring extending axially into and through the first groove and axially into the second groove and being deformed to the shape of the first conical surface, and the intermediate ring resting on the second surface of the rolling contact bearing ring;

a recess in the housing and overlying the second groove and shaped for receiving the intermediate ring.

8. The device of claim 7, wherein axially inward beyond the second groove, the housing in which the rolling contact bearing ring is disposed has a third surface of a first diameter and the rolling contact bearing ring has a cooperating fourth surface that cooperates with the third surface and has a second diameter corresponding to the first diameter for holding the rolling contact bearing ring in the housing.

9. The device of claim 7, wherein the recess in the housing has a second conical surface which is opposite and spaced from the first conical surface;

the first conical surface at the bearing ring having a larger angle of inclination with respect to the axis of the bearing than the second conical surface.

10. The device of claim 9, wherein the angle of the first conical surface is about 25° and the angle of the second conical surface is about 20°.

11. The device of claim 7, wherein the intermediate ring further includes a radially oriented flange positioned at the entrance side of the bearing ring for controlling the extent of insertion of the intermediate ring in the groove.

12. The device of claim 7, further comprising a pot-shaped cover over the entrance side, the cover having a periphery and the intermediate ring being formed at and from the periphery of the cover.

\* \* \* \* \*